US008775228B2

(12) United States Patent
Dan et al.

(10) Patent No.: US 8,775,228 B2
(45) Date of Patent: Jul. 8, 2014

(54) METHODS AND APPARATUS FOR AGREEMENT-BASED AUTOMATED SERVICE PROVISIONING

(75) Inventors: Asit Dan, Pleasantville, NY (US);
Henner Gimpel, Karlsruhe (DE); Heiko Ludwig, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 618 days.

(21) Appl. No.: 12/132,790

(22) Filed: Jun. 4, 2008

(65) Prior Publication Data

US 2008/0235149 A1 Sep. 25, 2008

Related U.S. Application Data

(63) Continuation of application No. 11/155,218, filed on Jun. 16, 2005, now abandoned.

(51) Int. Cl.
*G06Q 10/00* (2012.01)

(52) U.S. Cl.
USPC ........................................................ 705/7.12

(58) Field of Classification Search
USPC .............................................. 705/7.11–7.42
See application file for complete search history.

(56) References Cited

U.S. PATENT DOCUMENTS

| | | | |
|---|---|---|---|
| 6,148,290 A | 11/2000 | Dan et al. | |
| 6,601,233 B1 * | 7/2003 | Underwood | 717/102 |
| 6,742,015 B1 * | 5/2004 | Bowman-Amuah | 718/101 |
| 2002/0147611 A1 * | 10/2002 | Greene et al. | 705/1 |
| 2002/0198840 A1 * | 12/2002 | Banka et al. | 705/50 |
| 2003/0158920 A1 * | 8/2003 | Lynch et al. | 709/220 |
| 2003/0187970 A1 | 10/2003 | Chase et al. | |
| 2005/0043979 A1 * | 2/2005 | Soares et al. | 705/7 |
| 2005/0154735 A1 * | 7/2005 | Breh et al. | 707/10 |

FOREIGN PATENT DOCUMENTS

| | | |
|---|---|---|
| JP | 11212201 A | 8/1999 |
| JP | 2000316025 A | 11/2000 |
| JP | 2003141219 A | 5/2003 |

OTHER PUBLICATIONS

Netcentric and Client/Server Computeing: A Practical Guide. (1999). Goodyear et al. Andersen Consulting. CRC Press LLC.*
Andrieux A, Dan A, Keahy K and Rofrano J (2004). Negotiability Constraints in WS-Agreement. 1-7.*
Dan A, Ludwig H and Rofrano J (2004). WS-Agreement Structure. 1-16.*
Ludwig W, Dan A, and Kearney R (2004). Cremona: An Architecture and Library for Creation and Monitory of WS-Agreements. ICSOC. Nov. 15-19. pp. 65-74.*
A. Andrieux et al., "Web Services Agreement Specification," Version 1.1, Draft 18, pp. 1-47, May 2004.

(Continued)

*Primary Examiner* — Sujay Koneru
(74) *Attorney, Agent, or Firm* — Louis J Percello; Ryan, Mason & Lewis, LLP (57) ABSTRACT

Techniques are disclosed for automated provisioning of resources to fulfill a service agreement. For example, a technique for use by a service provider for automatically provisioning one or more resources based on at least one service agreement offer of a service client comprises the following steps/operations. The at least one service agreement offer is obtained. At least one implementation plan template is obtained. A provisioning description is then automatically derived in accordance with the service agreement offer and the implementation plan template, wherein the provisioning description is usable for configuring one or more resources such that a service may be provided to the service client.

18 Claims, 10 Drawing Sheets

(56) References Cited

OTHER PUBLICATIONS

E. Christensen et al., "Web Services Description Language (WSDL) 1.1,W3C Note," World Wide Web Consortium Technical Report, pp. 1-51, Mar. 2001.

V. Tosic et al, "WSOL—A Language for the Formal Specification of Classes of Service for Web Services," Proceedings of 2003 International Conference on Web Services, CSREA Press, 7 pages, Jun. 2003.

A. Dan et al, "Connecting Client Objectives with Resource Capabilities: An Essential Component for Grid Service Management Infrastructures," International Conference on Service Oriented Computing (ICSOC), pp. 1-8, 2004.

J. Clark et al., "XML Path Language (XPath)," Version 1.0, W3C Recommendation, pp. 1-37, Nov. 1999.

IBM Corporation: "Autonomic Computing Expression Language (ACEL) 1.2," User's Guide, pp. 1-34, 2005.

H. Ludwig et al., "Cremona: An Architecture and Library for Creation and Monitoring of WS-Agreements," Proceedings of ICSOC 2004, IEEE Press, Nov. 2004.

A. Anjomshoaa et al., "Job Submission Description Language (JSDL) Specification," GWD-R, Version 1.0, pp. 1-72, Jun. 2005.

\* cited by examiner

METHODS AND APPARATUS FOR AGREEMENT-BASED AUTOMATED SERVICE PROVISIONING

CROSS-REFERENCE TO RELATED APPLICATION(S)

This application is a continuation of pending U.S. application Ser. No. 11/155,218 filed on Jun. 16, 2005, the disclosure of which is incorporated herein by reference.

FIELD OF THE INVENTION

This present invention generally relates to service environments and, more particularly, to techniques for automated provisioning of resources to fulfill a service agreement.

BACKGROUND OF THE INVENTION

In the field of information technology (IT) services, services between entities are acquired by means of service agreements. When a prospective service client submits an agreement offer, a service provider must assess whether it can comply with the agreement offer and, if so, provision the necessary IT resources for the service to be delivered. IT resources include, for example, storage, computing and networking elements.

U.S. Pat. No. 6,148,290 to Dan et al., the disclosure of which is incorporated by reference herein, teaches the use of service agreements to automate the delivery of services between autonomous entities. A service agreement may define penalties and rewards associated with breaking or achieving service level objectives related to the service. In this case, the IT resource configuration of a provider set up for the delivery of an agreement must implement the service in the way that it trades off rewards received and penalties incurred with the costs of IT resource usage.

Formal representations of agreements enable the automatic interpretation of service agreements. WS-Agreement (see, e.g., A. Andrieux et al, "Web Services Agreement Specification," version 1.1, draft 18, May 2004, the disclosure of which is incorporated by reference herein) is a draft for a standard representation of service agreements and can be used in combination with service type specific representations, e.g., the Web Service Description Language (see, e.g., E. Christensen et al., "Web Services Description Language (WSDL) 1.1," World Wide Web Consortium Technical Report, the disclosure of which is incorporated by reference herein). The Web Services Offer Language is another representation to the same end (see, e.g., V. Tosic et al, "WSOL—A Language for the Formal Specification of Classes of Service for Web Services," Proceedings of 2003 International Conference on Web Services, CSREA Press, pp. 375-381, June 2003, the disclosure of which is incorporated by reference herein).

Deriving the set of resources, or alternative sets of resources necessary for implementing a service agreement, and subsequently provisioning this set, is essential for automating the process of automatically fulfilling service agreements. A. Dan et al, "Connecting Client Objectives with Resource Capabilities: An Essential Component for Grid Service Management Infrastructures," International Conference on Service Oriented Computing (ICSOC) 2004, pp. 57-64, the disclosure of which is incorporated by reference herein, teaches an approach how to translate performance objectives in multiple steps into resource requirements. However, the proposed approach per se does not automate the derivation. For each particular domain, e.g., computing job scheduling, a specific resource derivation model has to be defined and implemented by a programmer. The approach gives guidance how to do this, though it does not automate the resource requirement derivation by itself. Furthermore, it does not solve the provisioning problem.

Lastly, while there are template-based provisioning approaches available from such companies as AdventNet (Pleasanton, Calif.), Cisco (San Jose, Calif.) and Veritas (Mountain View, Calif.), these approaches do not take into account service agreements.

SUMMARY OF THE INVENTION

The present invention provides techniques for automated provisioning of resources to fulfill a service agreement.

For example, in one aspect of the invention, a technique for use by a service provider for automatically provisioning one or more resources based on at least one service agreement offer of a service client comprises the following steps/operations. The at least one service agreement offer is obtained. At least one implementation plan template is obtained. A provisioning description is then automatically derived in accordance with the service agreement offer and the implementation plan template, wherein the provisioning description is usable for configuring one or more resources such that a service may be provided to the service client.

Advantageously, techniques are provided for the interpretation and analysis of a service agreement offer submitted by a service client and the provisioning of one or more services in accordance with the service agreement offer.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be explained below in the context of an illustrative information technology (IT) service environment. However, it is to be understood that the present invention is not limited to such a service environment. Rather, the invention is more generally applicable to any service environment in which it would be desirable to provide automated provisioning of resources to fulfill a service agreement.

Accordingly, as will be explained herein, illustrative principles of the invention provide for automated provisioning of IT resources to fulfill a service agreement. It is to be understood that the term "automated" and the term "automatically" generally describe steps or operations that are not performed manually (e.g., by a human operator) but rather are performed via one or more processing systems or devices (e.g., by a computer system).

Furthermore, illustrative principles of the invention relate to service agreements that contain formalized quality of service guarantees and the automated derivation of IT resource requirements to fulfill the service guarantees. More specifically, illustrative principles of the invention relate to the creation of an automatically executable deployment plan for IT computing and other resources based on a formal representation of a deployment plan template associated with a formal representation of an agreement template, and finally executing the deployment plan using a provisioning system.

Thus, illustrative principles of the invention provide techniques for automatically deriving an executable "provisioning description" for a service agreement between a service provider and a service client. The provisioning description comprises a formal, machine-interpretable description of the set of resources to be configured to implement the plan, the configuration information, and the process steps and their sequence to configure the resources according to the configuration information. The provisioning description is executed by a provisioning engine that acquires resources and configures according to the description.

Illustrative principles of the invention associate each agreement offer submitted thereto with an agreement implementation plan template describing how a provisioning description will be derived from contents of an agreement offer adhering to a know structure. The agreement implementation plan template contains a template of a provisioning description having open fields that are filled in for each created instance of the provisioning description. From the perspective of the fill-in process, the provisioning description is a text or Extensible Markup Language (XML) document into which more text is inserted.

The use of agreement templates published to potential service clients greatly enhances service clients' ability to create agreement offers that can be processed by agreement implementation plan templates. Hence, life-cycle management for agreement templates and their associated agreement implementation plan template increases the effectiveness of the inventive techniques.

Using the techniques of the invention, services can be provisioned according to agreements without the provisioning description mechanism understanding the semantics of the provisioned system domain and hence can be applied to any environment where provisioning systems accepting a formal input language are available. To date, this process of deriving a provisioning description is mainly conducted by hand if service clients are given substantial flexibility in creating agreement offers.

Figure 1:
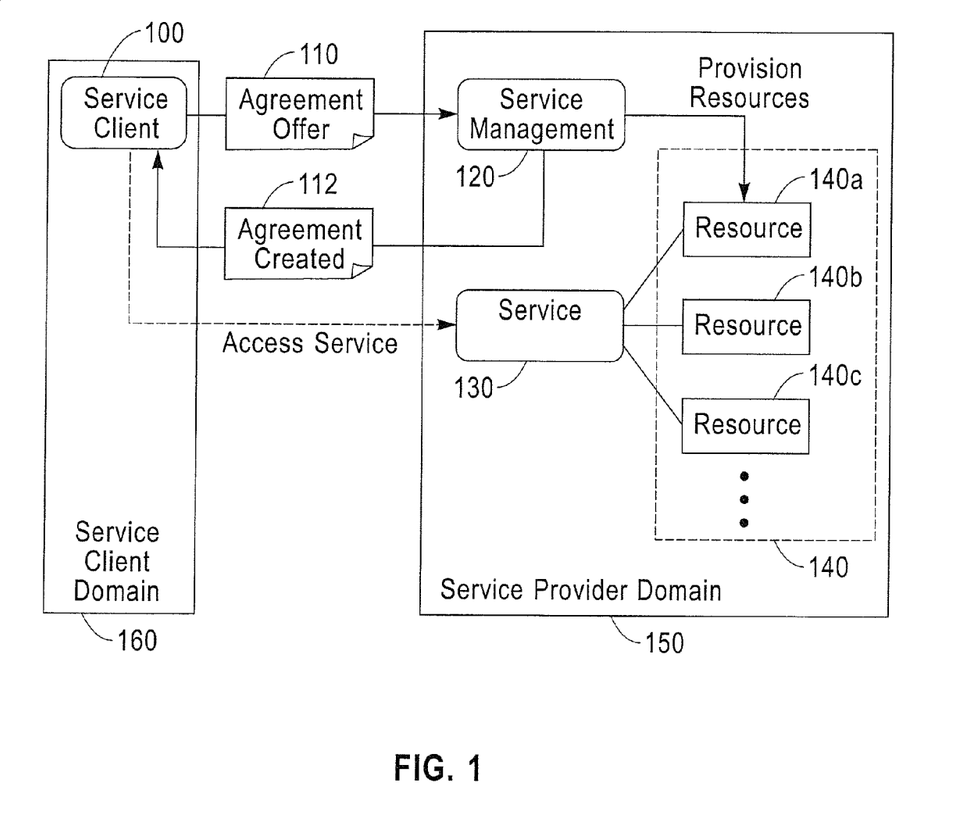
FIG. 1 shows components and interactions of a system in which a client establishes an agreement with a service provider on a service, the provider provisions the service, and the client subsequently consumes the service according to the agreement, according to an embodiment of the present invention.

FIG. 1 shows components and interactions of a system in which a client establishes an agreement with a service provider on a service, the provider provisions the service, and the client subsequently consumes the service according to the agreement, according to an embodiment of the present invention.

As shown, a service provider domain 150, for example, a company or a data center of a large organization, offers services 130 to one or more service clients 100 in service client domains 160, which can be either external companies or other organizational units within the same company. Services 130 may include web services accessed using the Simple Object Access Protocol (SOAP) or a Representational State Transfer (REST) over the Hypertext Transfer Protocol (HTTP), job execution services, for example, in a computational grid, web hosting services, and networking services. Services are provided using resources 140a-c out of a pool of resources 140. Resources may include computers, network elements and communication connections.

Before a service client 100 can access a service 130, an agreement will be established between the service provider domain 150 and the service client domain 160. To establish an agreement, a service client 100 submits an agreement offer 110 to the service management 120 of a service provider domain. Agreement offers can be represented in various ways, for example, using the WS-Agreement format for agreement offers.

Upon acceptance of the agreement offer 110, the service management 120 will provision resources out of the resource pool 140 such that a service's behavior complies with the terms defined in the accepted agreement offer or within a margin of deviation acceptable to the service provider domain 150. Service management 120 has to determine the number of resources devoted to the service and the resources' configuration. Resources can be exclusively used for one service of one service client, for a service shared by multiple service clients or by multiple services sharing the same resource. Also, the service client that presented the service offer is informed via an agreement response 112 from the service management that an agreement has been created. When the service 130 is provisioned, the service client 100 can access the service.

Figure 2:
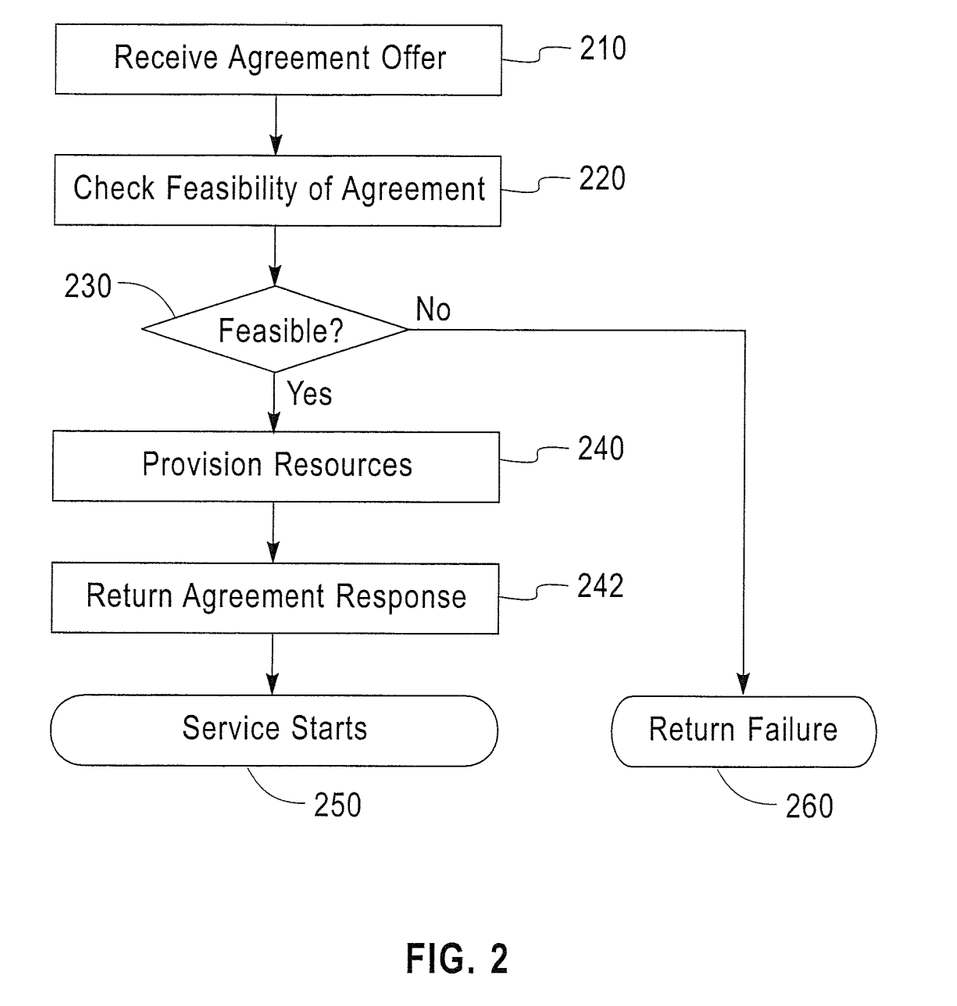
FIG. 2 outlines an algorithm executed by a provider's service management, according to an embodiment of the present invention.

FIG. 2 outlines an algorithm executed by a provider's service management, according to an embodiment of the present invention. More particularly, FIG. 2 outlines a high-level algorithm according to which the service management 120 component works.

First, in step 210, the service management algorithm receives the agreement offer. To this end, an agreement submission interface is exposed, for example, the agreement factory interface as defined in the WS-Agreement specification. Subsequently, the feasibility of the agreement is checked, in step 220. Feasibility refers to the syntactic verification, the successful derivation of resource configurations and the availability of resources at the desired time of service.

If the agreement offer is not considered feasible (step 230), the failure of the agreement establishment is returned to the service client through a message, in step 260. If the agreement is feasible (step 230), the service management provisions resources, in step 240, to implement the service. The service client that presented the service offer is informed via an agreement response from the service management, in step 242, that an agreement has been created. The service management then starts the service, in step 250, by making it available to the service client.

Figure 3:
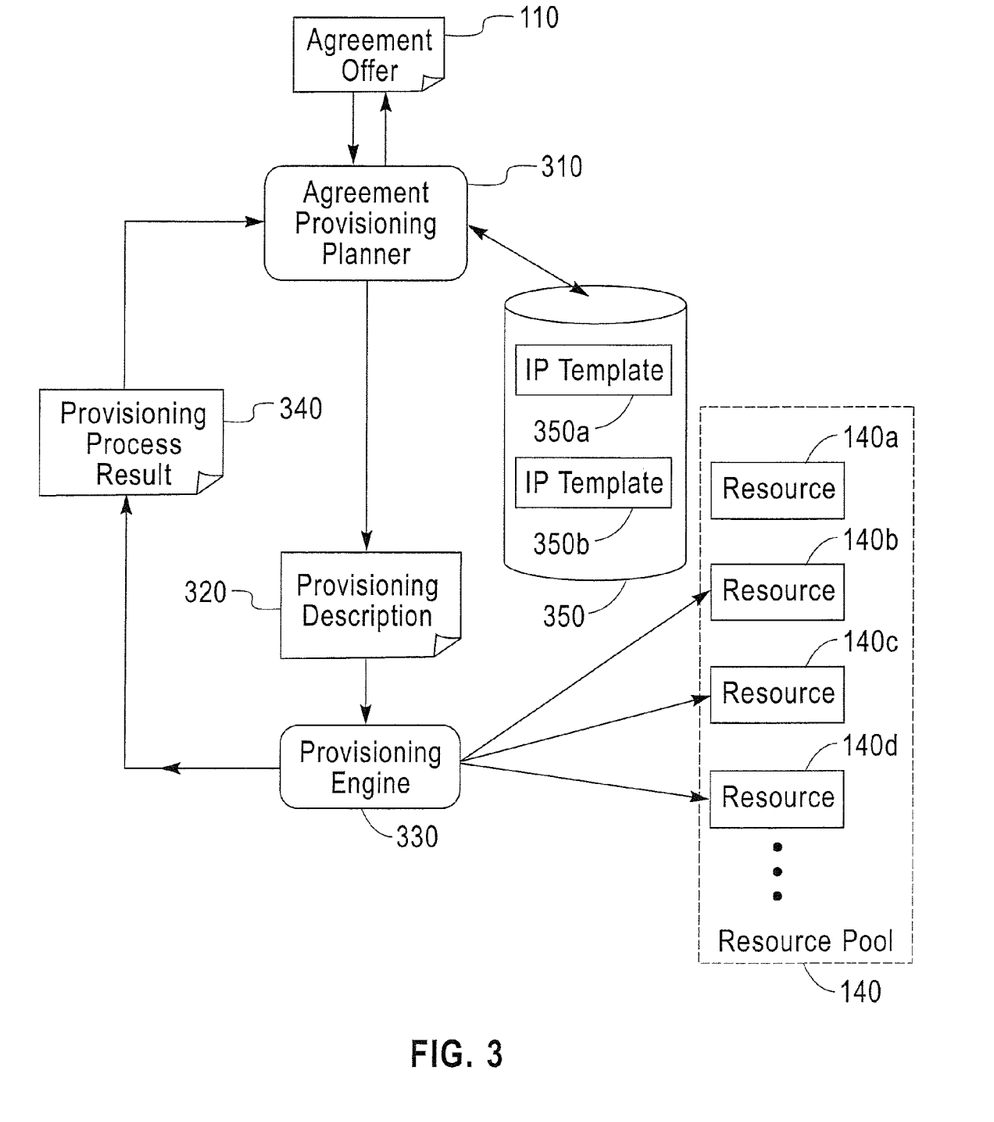
FIG. 3 decomposes the service management function of a service provider and outlines the use of agreement implementation plan templates, according to an embodiment of the present invention.

The service management component (120 in FIG. 1) comprises two sub-components, as outlined in FIG. 3. More particularly, FIG. 3 decomposes the service management function of a service provider and outlines the use of agreement implementation plan templates, according to an embodiment of the present invention.

As shown, the first sub-component is the Agreement Provisioning Planner 310, which analyzes an agreement offer 110, checks its syntactic feasibility and devises a Provisioning Description 320. To this end, the service management component uses one or more Agreement Implementation Plan (IP) Templates, 350a, 350b, . . . , from its Agreement Implementation Plan Template repository 350. IP templates contain a description how to create a Provisioning Description 350 from a given agreement offer.

The second sub-component is a Provisioning Engine 330. The Provisioning Engine executes the Provisioning Description 320 by acquiring the required resources and configuring them. The Provisioning Engine 330 reports the Provisioning Process Result 340, i.e., success or failure of the resource configuration back to the Agreement Provisioning Planner 310. In case of failure, the Agreement Provisioning Planner 310 can devise an alternate Provisioning Description. The Agreement Provisioning Planner 310 also communicates the "created agreement" message (112 in FIG. 1) back to the service client.

Figure 4:
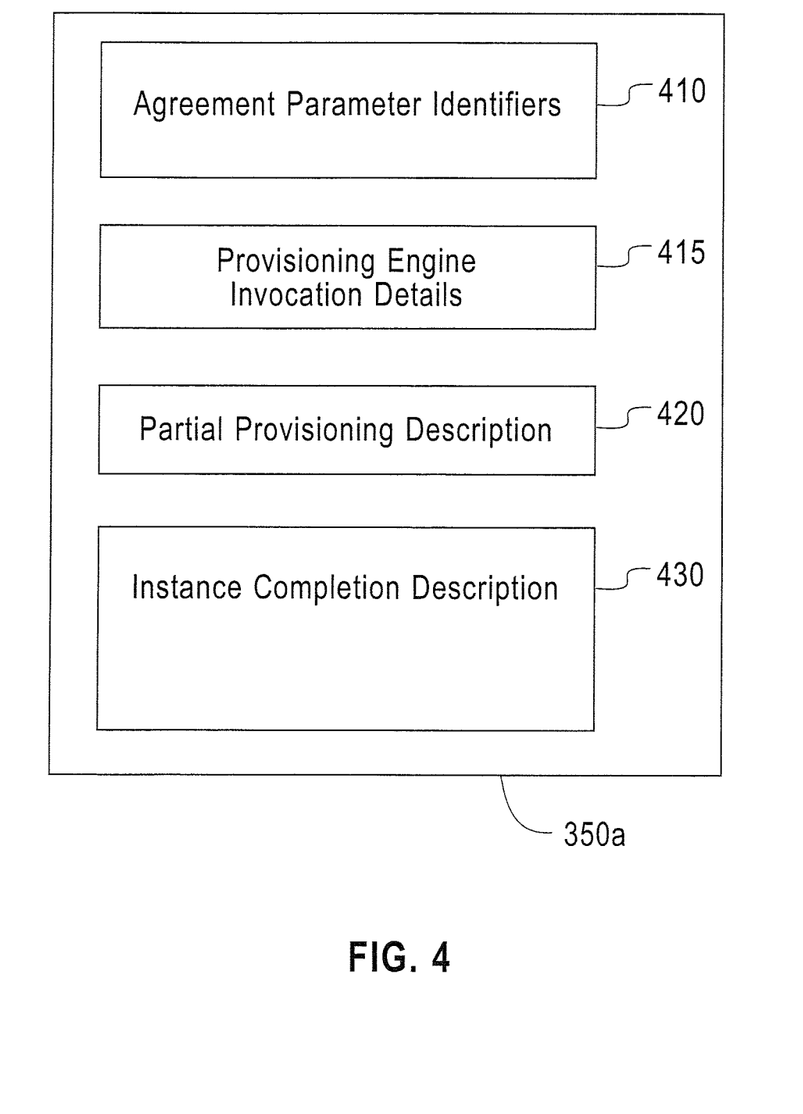
FIG. 4 shows the structure of an agreement implementation plan template, according to an embodiment of the present invention.

An example of an Agreement Implementation Plan (IP) Template (350a, 350b, in FIG. 3) is illustrated in FIG. 4. The IP Template, and the process that uses it, is agnostic to the semantics of Agreement Offers 110 and Provisioning Descriptions 320. The template describes the derivation of a Provisioning Description 320 from a template provisioning description, referred to as a Partial Provisioning Description 420, containing fields to be filled in based on Agreement Offer parts identified in the Agreement Parameter Identifiers 410 section according to the Instance Completion Description 430.

Thus, it is to be understood that the IP Template 350 contains a template of a provisioning description (Partial Provisioning Description 420) having open fields that are filled in for each created instance of the provisioning description. The resulting end product (filled-in results) is one or more Provisioning Specification Instances. The one or more Provisioning Specification Instances serve as the Provisioning Description 320 (FIG. 3) that is provided to Provisioning Engine 330.

Also shown as part of an IP Template are the Provisioning Engine Invocation Details 415. It is to be appreciated that principles of the invention take into account environments with multiple provisioning engines. This is done by defining the Address or Endpoint to which the Provisioning Specification Instance (Provisioning Description 320) is sent. In one illustrative embodiment, the system may use an Endpoint Reference according to the WS-Addressing specification. An example in the simplest case is:

```
<ProvisioningEngineInvocationDetails>
    <wsa:EndpointReference>
        <wsa:Address>
            http://management.ibm.com:8080/provisioning/
        </wsa:Address>
    </wsa:EndpointReference>
</ProvisioningEngineInvocationDetails>
```

Furthermore, the IP Template can be represented in a convenient format, for example, in an XML structure:

```
<ImplementationPlanTemplate>
    <AgreementParameterIdentifiers>
        ...
    </AgreementParameterIdentifiers>
    <ProvisioningEngineInvocationDetails>
        ...
    </ProvisioningEngineInvocationDetails>
    <ProvisioningProcessDescription>
        ...
    </ProvisioningProcessDescription>
    <InstanceCompletionDescription>
        ...
    </InstanceCompletionDescription>
</ImplementationPlanTemplate>
```

Figure 5:
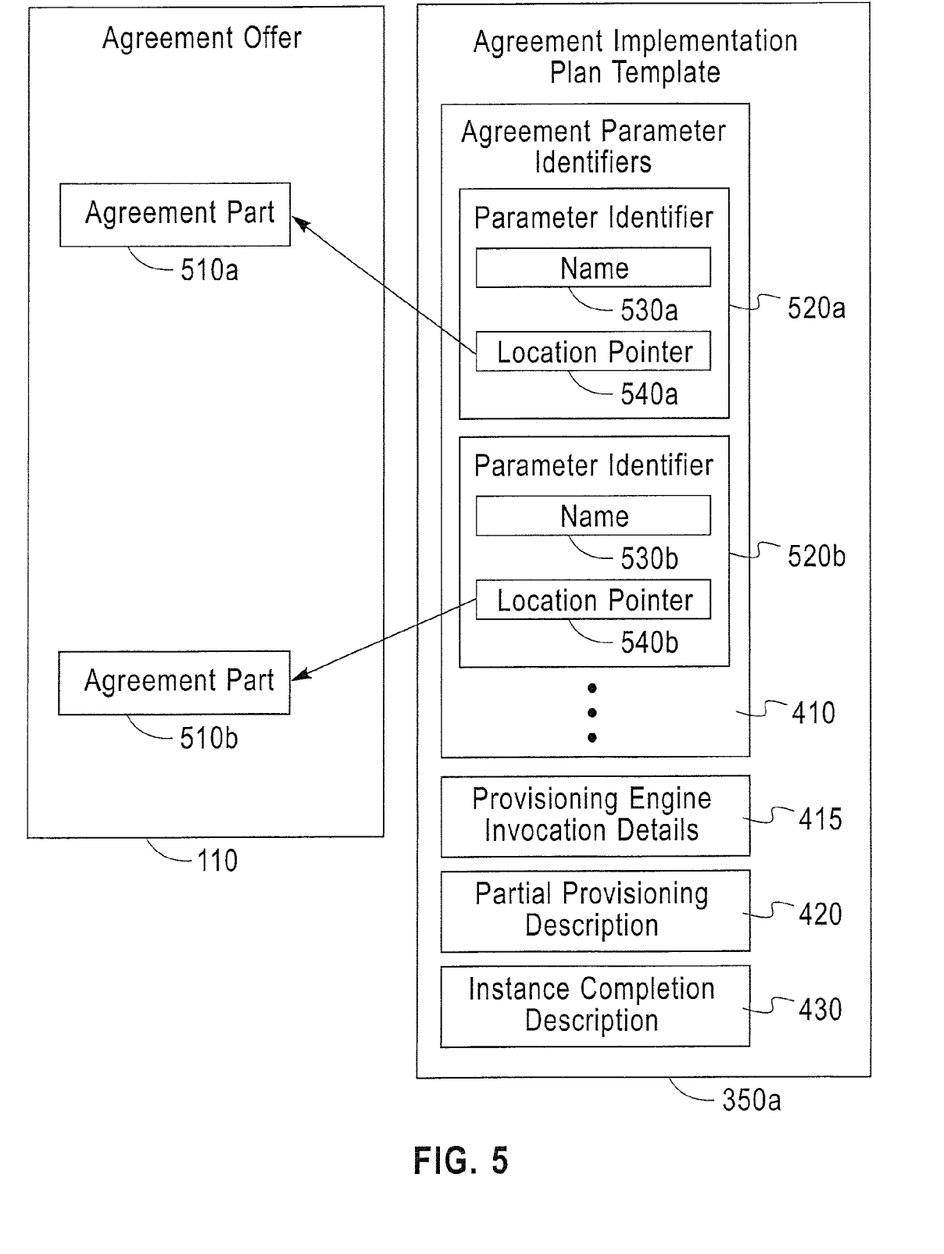
FIG. 5 illustrates how an agreement implementation plan template relates to parts of an agreement offer submitted by a client, according to an embodiment of the present invention.

The purpose of the Agreement Parameter Identifiers section is to relate the IP Template to agreements to which it can be applied, illustrated in FIG. 5. When designing IP Templates, one has to relate them to a class of potential agreements that follow a similar structure, potentially being created according to an agreement template, as, for example, the WS-Agreement draft specification suggests. Each Parameter Identifier, 520a, 520b, . . . , in this section is comprised of a unique Name, 530a, 530b, . . . , and a Location Pointer, 540a, 540b, . . . . The Location Pointer points to exactly one location in an agreement, referred to as Agreement Part, 510a, 510b, . . . . Agreement parts can be any clearly identified substructure of an agreement. In an XML representation such as the WS-Agreement draft, substructures can be elements or attributes of elements.

If an agreement is represented in an XML data structure, the XPath format (see, e.g., Clark, James; DeRose, Steve 1999: "XML Path Language (XPath)," Version 1.0, W3C Recommendation, November 1999, the disclosure of which is incorporated by reference herein) can be employed to represent this Location Pointer information. However, while XPath expressions can point to a set of locations at a time, the use of XPath in this context requires that the author of an XPath expression makes sure it resolves to one and only one single location in an agreement document.

Parameter Identifiers can be represented in XML using XPath as the example below shows:

```
...
<AgreementParameterIdentifiers>
    <ParameterIdentifier Name="AverageResponseTime">
        <LocationPointer>
            //wsag:GuaranteeTerm[@wsag:Name='response-
            TimeGuarantee']/*Value
        </LocationPointer>
    </Parameter>
    ...
</AgreementParameterIdentifiers>
...
```

The name of the parameter is AverageResponseTime and it's location in an agreement to which the IP Template is applied is defined as the XPath expression in the Location- Pointer element. In the example, the parameter refers to the content of the element Value of a guarantee term specified in the WS-Agreement format whose name is responseTimeGuarantee.

For agreement representations other than XML, those skilled in the art can use or readily devise a corresponding pointer format.

The Instance Completion Description 430 section of the agreement defines what parts will be filled in and substituted in the Partial Provisioning Description 420 and how the value to be filled in is determined.

Figure 6:
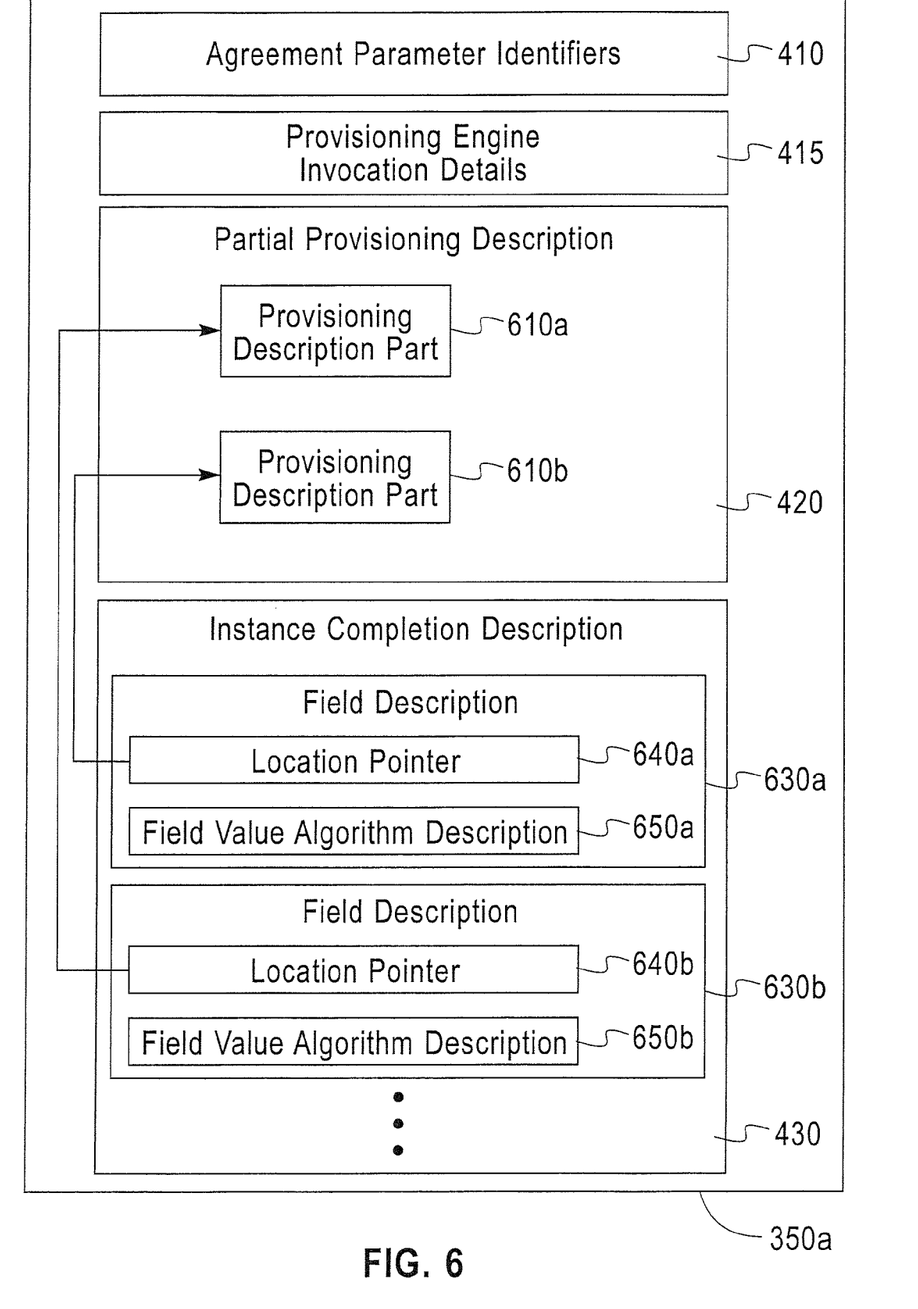
FIG. 6 shows how a fill-in mechanism of variable fields of a provisioning description is described in an agreement implementation plan template, according to an embodiment of the present invention.

FIG. 6 illustratively explains the structure of the Instance Completion Description and the way in which it relates to the Provisioning Description. A Provisioning Description Part, 610*a*, 610*b*, . . . , is a clearly identifiable part of a Partial Provisioning Description 420 whose value will be created for each instance of an Agreement Implementation Plan dependent on the specific agreement offer to which it is applied. The Instance Completion Description comprises a set of Field Descriptions, 630*a*, 630*b*, . . . , each of which explains how to create a value for a Provisioning Description Part, 610*a*, 610*b*, . . . . A Field Description comprises a Location Pointer, 640*a*, 640*b*, . . . , and a Field Value Algorithm Description, 650*a*, 650*b*, . . . .

The Location Pointer of the Instance Completion Description 430 is designed along the same principles as the Location Pointer of the Parameter Identifiers, 530*a*, 530*b*, . . . . In the case of the Provisioning Description being an XML structure, XPath can be used to point to a specific XML element or attribute.

The Field Value Algorithm Description, 650*a*, 650*b*, . . . , contains a representation of an algorithm in a format that can be interpreted by the Agreement Provisioning Planner. In this algorithm, Agreement Parts, 510*a*, 510*b*, . . . , can be referred to as constants or variables, as suitable for the chosen format. The PMAC Expression Language (see, e.g., IBM Corporation: "PMAC Expression Language Users Guide," Alphaworks PMAC distribution, 2005, www.alphaworks.ibm.com) is one suitable representation, as the following example illustrates:

```
...
<InstanceCompletionDescription>
    <FieldDescription>
        <LocationPointer>
            //ProvisioningProcessDescription/*NumberOfServers
        </LocationPointer>
        <FieldValueAlgorithmDescription>
            <exp:Plus>
                <exp:FloatConstant>
                    <Value>02.000</Value>
                </exp:FloatConstant>
                <exp:Divide>
                    <exp:FloatConstant>
                        <Value>01.000</Value>
                    </exp:FloatConstant>
                    <exp:Variable name="AverageResponseTime"/>
                </exp:Divide>
            </exp:Plus>
        </FieldValueAlgorithmDescription>
    </FieldDescription>
    ...
</InstanceCompletionDescription>
...
```

The Location Pointer refers to an XML element NumberOfServers in the Provisioning Description. It will get assigned the value of the Field Value Algorithm Description, represented in the PMAC expression language, 2+1/AverageResponseTime. In this example, the number of servers to be provisioned increases the shorter the average response time is chosen. AverageResponseTime refers to an Agreement Part, 510*a*, 510*b*, . . . , identified by a Parameter identifier, 520*a*, 520*b*, . . . , as shown in the example above.

The Provisioning Description 320 has a format that is interpreted by the Provisioning Engine 330. Skipping now to FIG. 8, the main elements of the Provisioning Description 320 are outlined.

Figure 8:
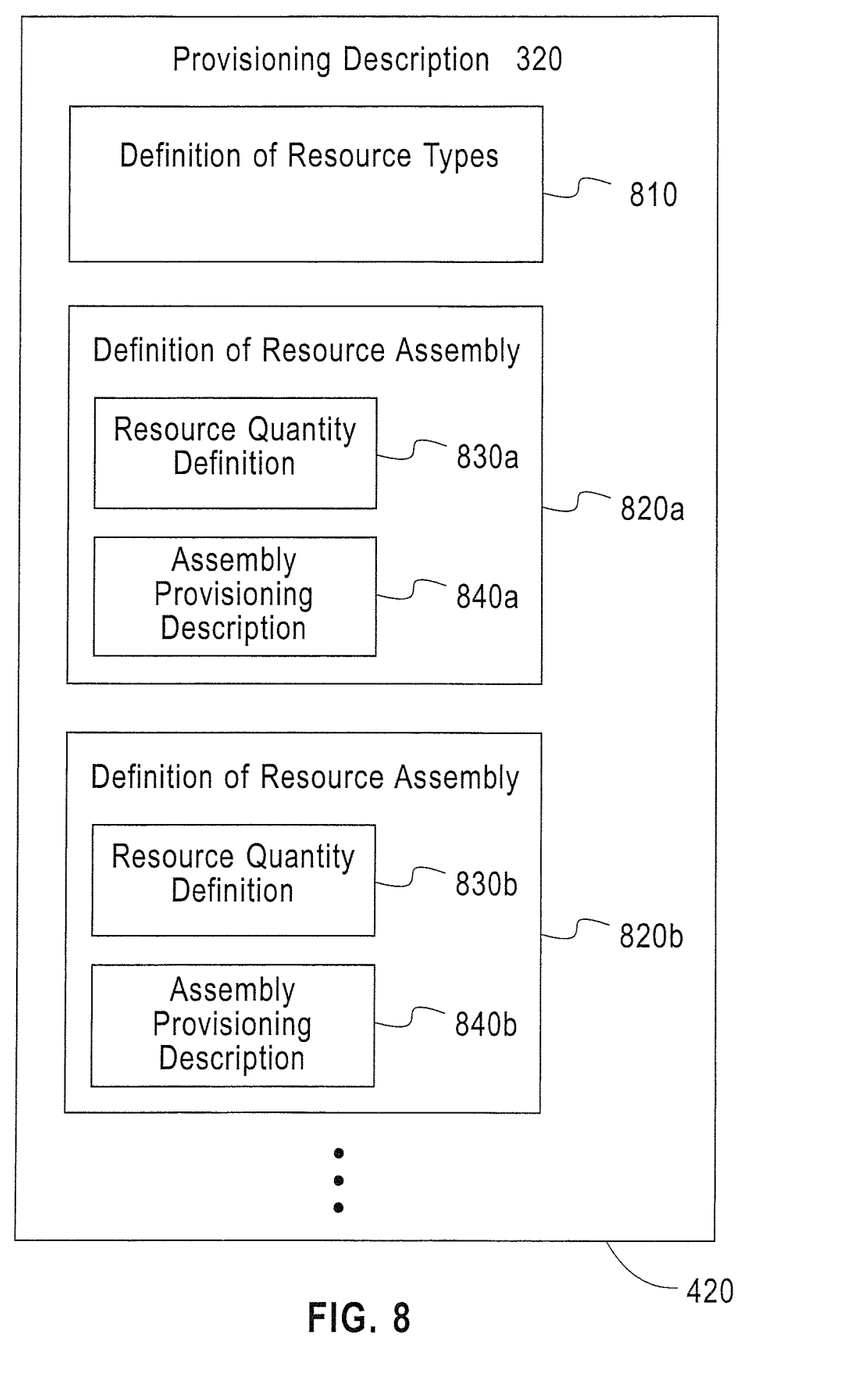
FIG. 8 depicts an example provisioning description, according to an embodiment of the present invention.

A Provisioning Description comprises a Definition of Resource Types 810 and one or more Definitions of Resource Assembly 820*a*, 820*b*, . . . , which are alternatives and among which can be chosen depending on resource availability and cost considerations.

The Definition of Resource Types contains the information to uniquely identify the type of resources to a resource pool, e.g., the cluster management system of a data center (140 in FIG. 1), to query the resources availability. It can be represented in an XML structure as the following example illustrates:

```
<ResourceTypeDefinitions>
    <ResourceType name="P-Series>
        <HostType description="pSeries550">
            <HostArchitecture>
                <CPUCount>4</CPUCount>
            </HostArchitecture>
            ...
        </HostType>
    </ResourceType>
    ...
</ResourceTypeDefinitions>
```

The Definition of Resource Assembly, 820*a*, 820*b*, . . . , comprises a Resource Quantity Definition, 830*a*, 830*b*, . . . , indicating how many resources of which type are needed for this assembly. The Assembly Provisioning Definition, 840*a*, 840*b*, . . . , contains a workflow description or a script that defines how the resources will be provisioned and in which order. This definition is typically written in a script language such as a Unix shell script or Perl, or in a workflow language such as the Business Process Execution Language For Web Services (BPEL4WS).

Figure 7:
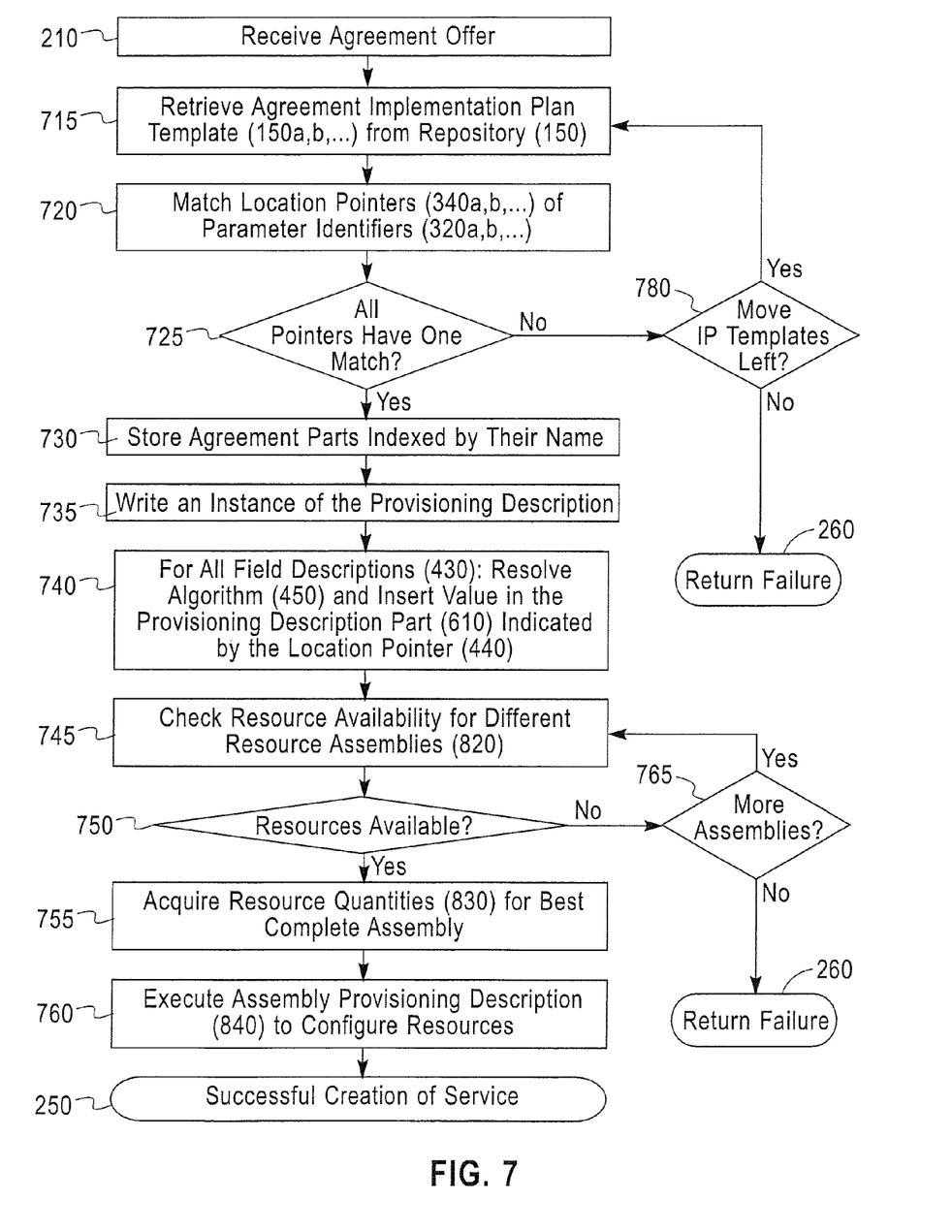
FIG. 7 shows a full algorithm executed by a service management function, according to an embodiment of the present invention.

FIG. 7 shows a full algorithm executed by a service management function, according to an embodiment of the present invention. More particularly, FIG. 7 describes an algorithm that Agreement Provisioning Planner 310 and Provisioning Engine 330 execute. The Agreement Provisioning Planner 310 executes the steps up to and including step 740 to create a complete instance of a Provisioning Description 320 and makes use of the IP Template 250*a*, 250*b*, . . . , to do so. The subsequent steps are executed by the Provisioning Engine 330 based on the generated Provisioning Description 320 and include the acquisition of resources and their configuration.

When an Agreement Offer 110 is received in the receive agreement step 210, the algorithm starts. The Agreement Provisioning Planner retrieves the set of IP Templates from their repository, in step 715. The Agreement Provisioning Planner chooses the first template. For the first IP template, the Planner verifies in step 720 the Location Pointer of each Parameter Identifier, if it points to one and only one location in the received agreement offer.

If all Location Pointers have one match (step 725), the algorithm proceeds to step 730. Otherwise, it is checked if there are more IP Templates left in step 780. If not, failure is returned in step 260. Otherwise, the algorithm goes back to step 715 and tries the next IP Template. If all Location Pointers have a match, all Agreement Part values are stored indexed by their name given in the Parameter Identifiers of the IP Template in step 730.

Next, an instance of the Provisioning Description is written in memory in step 735. Then, for all Field Descriptions, the algorithm executes the Field Value Algorithm Description (650) and inserts the value returned by the algorithm in the Provisioning Description instance at the location indicated by the Location Pointer (640) of the Field Description (630), in step 740. With the completion of this step, the algorithm yields a complete and executable instance of the Provisioning Description 320, advantageously, without a need to understand the semantics of the Provisioning Description 320. This Provisioning Description 320 instance is sent to the Provisioning Engine 330 specified in the Provisioning Engine Invocation Details 415 given in the IP Template 350*a*. That is, to determine the particular provisioning engine, the process retrieves the provisioning engine's endpoint from the IP template.

The next steps are executed by the Provisioning Engine 330, executing the Provisioning Description 320. The algorithm proceeds as follows. First, it selects the first Definition of Resource Assembly and checks whether the resources can be acquired from the resource pool in the quantity indicated by the Resource Quantity Definition of the respective Definition of the Resource Assembly, in step 745. If not (step 750), the algorithm checks (step 765) if more alternative Definitions of Resource Assemblies are in the Provisioning Description. If so, it continues with step 745, otherwise, it signals failure (block 260) to the Agreement Provisioning Planner 310.

If all resources of an assembly are available (step 750), the algorithm acquires those resources in the defined quantities, in step 755. Then, the Assembly Provisioning Description is executed to configure the assembly, in step 760. If this step completes, the provisioning is complete and the service can be used (block 250).

A service provider using the mechanism of the present invention should carefully manage which Agreement Implementation Plan Templates it uses for which types of agreement. As a service provider's resource pool changes over time, for example, by acquiring more modern and powerful host computers, the Agreement Implementation Plan Templates should change. Furthermore, the type of services for which a service provider accepts agreement offers changes over time and must be managed corresponding. In addition, to facilitate the creation of acceptable agreement offers by service clients, service providers should provide agreement templates to clients.

Figure 9:
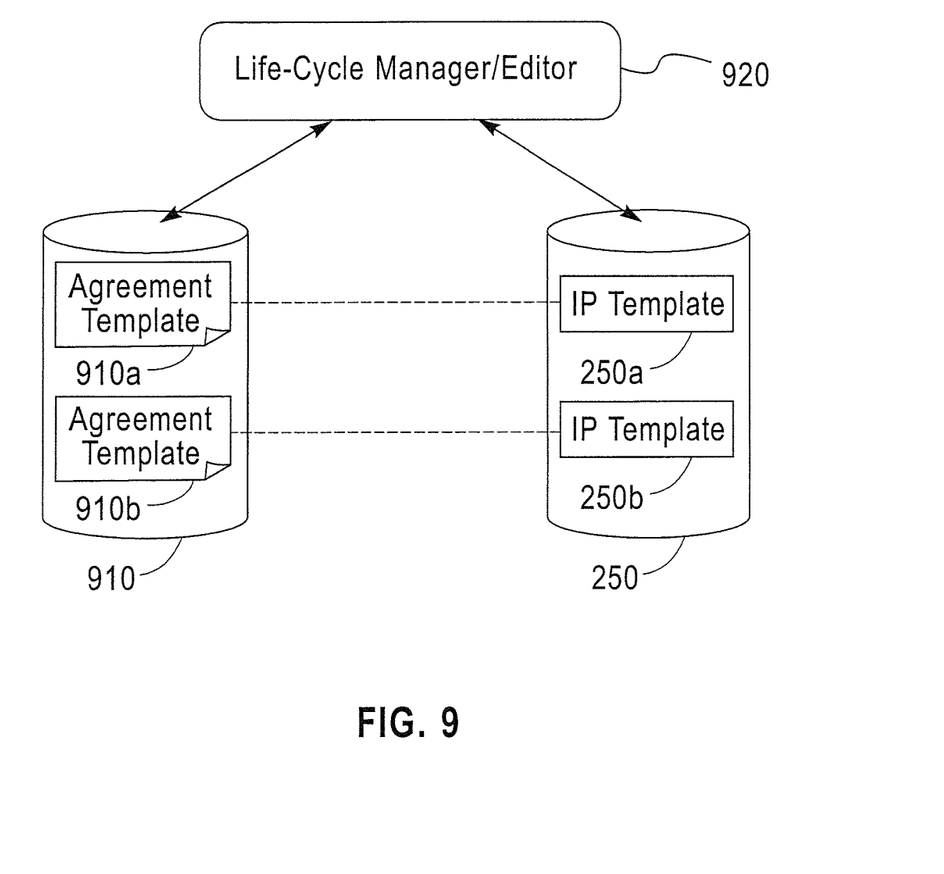
FIG. 9 illustrates how agreement implementation plan templates are associated with agreement templates and their life-cycle is consistently managed by a life-cycle manager and editor, according to an embodiment of the present invention.

Hence, as outlined in FIG. 9, service providers use a Life-Cycle Manager and Template Editor 920 to create Agreement Templates, 910*a*, 910*b*, . . . , and one or more associated IP Templates, 350*a*, 350*b*, . . . . The use of Agreement Templates enables service providers to write IP Templates more efficiently as they know the structure of agreement offers to expect and hence can effectively write Agreement Parameter Identifiers.

That is, the life-cycle manager/editor can be used as an automated agreement provisioning system that is able to create a service offer, create an associated agreement template, create an associated IP template, and remove and change the artifacts of such offers and templates.

Figure 10:
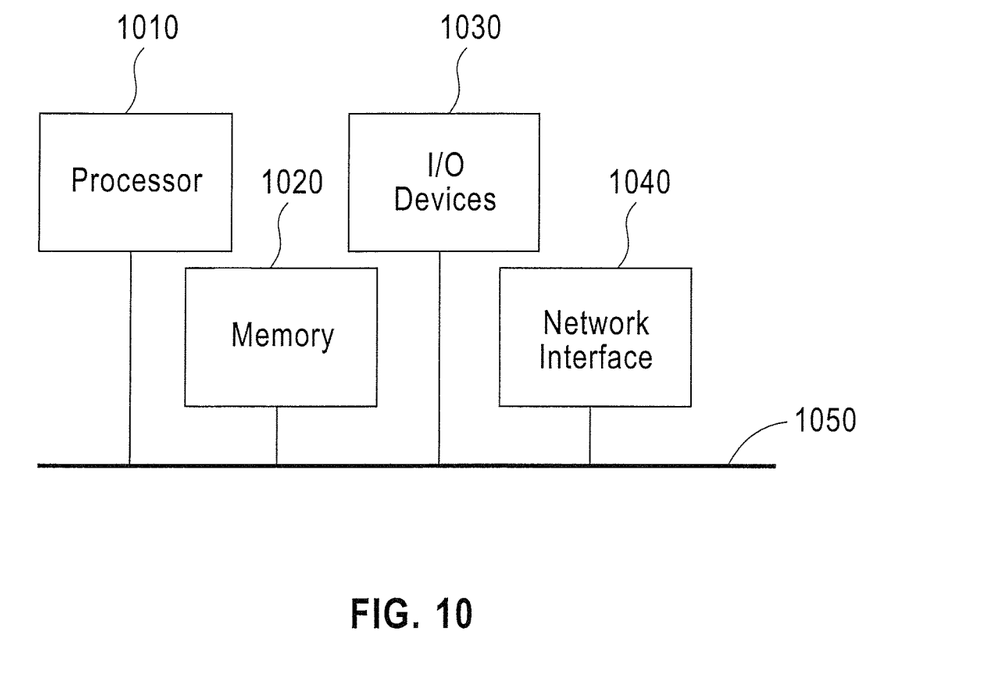
FIG. 10 is a diagram illustrating a computing system in accordance with which one or more components/steps of an agreement-based automated service provisioning system may be implemented, according to an embodiment of the present invention.

FIG. 10 depicts a computing system in accordance with which one or more components/steps of an agreement-based automated service provisioning system (e.g., components and methodologies described in the context of FIGS. 1 through 9) may be implemented, according to an embodiment of the present invention. It is to be understood that the individual components/steps may be implemented on one such computer system or on more than one such computer system. In the case of an implementation on a distributed computing system, the individual computer systems and/or devices may be connected via a suitable network, e.g., the Internet or World Wide Web. However, the system may be realized via private or local networks. In any case, the invention is not limited to any particular network.

Thus, the computing system shown in FIG. 10 represents an illustrative computing system architecture for implementing, among other things, one or more functional components/steps of an agreement-based automated service provisioning system, e.g., implementation plan templates, agreement templates, provisioning planner, provisioning engine, life cycle manager/editor, etc., as may be maintained by a service provider. Further, the computing system architecture may also represent an implementation of one or more of the actual resources provided by the service provider. Still further, the computing system architecture may also represent an implementation of one or more service clients.

As shown, the computing system architecture may comprise a processor 1010, a memory 1020, I/O devices 1030, and a network interface 1040, coupled via a computer bus 1050 or alternate connection arrangement.

It is to be appreciated that the term "processor" as used herein is intended to include any processing device, such as, for example, one that includes a central processing unit (CPU) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Accordingly, as illustratively explained herein, principles of the invention provide a formal resource provisioning specification comprising a method to extract information from an agreement, a method to derive new parameters, a method to create resource assembly alternatives, and a method to compare alternatives.

A mechanism for executing the specification is also provided. By way of example, the mechanism may be operative to: automatically extract agreement offer elements for offers based on agreement templates; automatically derive implementation plan allocation parameters from agreement offer elements based on, potentially external, functions; automatically parameterize the implementation plan template with derived values; and automatically choose allocation alternatives based on the business value of allocation alternatives in a business plan.

Using this mechanism: detailed resource requirements (like number and configuration of servers) are derived from services guarantees (such as response time goals); alternatives are chosen; required resources are acquired; the overall decision whether or not to accept the service request is made based on the business value of alternative allocations; and the activation of service provisioning can be triggered based on the resulting allocation.

Advantageously, as described in detail herein, principles of the invention provide implementation plan templates and an engine for automatically processing such templates. Such a template comprises information on four major aspects: identification of agreement parameters; a method to determine the respective amounts of different types of resources based on agreement parameters; configuration and assembly of resource types; and definition of resource types.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for use by a service provider for automatically provisioning one or more resources based on at least one service agreement offer of a service client, comprising the steps of:
    obtaining the at least one service agreement offer;
    obtaining at least one implementation plan template; and
    automatically deriving a provisioning description in accordance with the service agreement offer and the implementation plan template, wherein the provisioning description is usable for configuring one or more resources such that a service may be provided to the service client;
    wherein at least the automated provisioning description derivation step is performed by a processor;
    wherein the implementation plan template comprises a provisioning description template having one or more open fields; and
    wherein the automated provisioning description derivation step comprises generating a provisioning specification instance by (i) automatically determining one or more values corresponding to the one or more open fields of the provisioning description template based at least in part on the service agreement offer; and (ii) automatically filling in the one or more open fields of the provisioning description template with the one or more values based at least in part on the implementation plan template.

2. The method of claim 1, wherein the automated provisioning description derivation step further comprises the step of extracting one or more elements from the agreement offer.

3. The method of claim 2, wherein the automated provisioning description derivation step further comprises the step of determining one or more allocation parameters associated with the implementation plan template based on the one or more extracted agreement offer elements.

4. The method of claim 3, wherein the automated provisioning description derivation step further comprises the step of generating the provisioning description based on the one or more allocation parameters.

5. The method of claim 1, wherein the automated provisioning description derivation step further comprises the step of automatically checking the feasibility of the agreement offer.

6. The method of claim 5, wherein the automatic feasibility checking step further comprises at least one of syntactically verifying the agreement offer, determining success of deriving a resource configuration based on the agreement offer, and determining availability of one or more resources of the resource configuration at a desired time of service.

7. The method of claim 5, wherein the automated provisioning description derivation step further comprises the step of informing the service client of a result of the feasibility check.

8. The method of claim 1, wherein the automated provisioning description derivation step further comprises the step determining a match between one or more elements of the service agreement offer and one or more parameters of the implementation plan template.

9. The method of claim 8, wherein the automated provisioning description derivation step further comprises the step generating an instance of a provisioning description when a match is determined.

10. The method of claim 1, further comprising the step of providing at least one agreement template to the service client for use in generating the service agreement offer.

11. The method of claim 1, wherein the automated provisioning description derivation step further comprises use of the implementation plan template to identify one or more agreement parameters.

12. The method of claim 1, wherein the automated provisioning description derivation step further comprises use of the implementation plan template to determine respective amounts of different types of resources based on one or more agreement parameters.

13. The method of claim 1, wherein the automated provisioning description derivation step further comprises use of the implementation plan template to configure and assemble one or more types of resources.

14. The method of claim 1, wherein the automated provisioning description derivation step further comprises use of the implementation plan template to define one or more types of resources.

15. The method of claim 1, wherein the automated provisioning description derivation step further comprises representation of the implementation plan template as an Extensible Markup Language structure.

16. The method of claim 1, further comprising the step of executing the provisioning description.

17. Apparatus for use by a service provider for automatically provisioning one or more resources based on at least one service agreement offer of a service client, comprising:
    a memory; and
    at least one processor coupled to the memory and operative to: (i) obtain the at least one service agreement offer; (ii) obtain at least one implementation plan template; and (iii) automatically derive a provisioning description in accordance with the service agreement offer and the implementation plan template, wherein the provisioning description is usable for configuring one or more resources such that a service may be provided to the service client;

wherein the implementation plan template comprises a provisioning description template having one or more open fields; and wherein the automated provisioning description derivation step comprises generating a provisioning specification instance by (i) automatically determining one or more values corresponding to the one or more open fields of the provisioning description template based at least in part on the service agreement offer; and (ii) automatically filling in the one or more open fields of the provisioning description template with the one or more values based at least in part on the implementation plan template.

18. An article of manufacture for use by a service provider for automatically provisioning one or more resources based on at least one service agreement offer of a service client, comprising a non-transitory machine readable storage medium containing one or more programs which when executed by a processor implement the steps of:

obtaining the at least one service agreement offer;

obtaining at least one implementation plan template; and automatically deriving a provisioning description in accordance with the service agreement offer and the implementation plan template, wherein the provisioning description is usable for configuring one or more resources such that a service may be provided to the service client;

wherein the implementation plan template comprises a provisioning description template having one or more open fields; and wherein the automated provisioning description derivation step comprises generating a provisioning specification instance by (i) automatically determining one or more values corresponding to the one or more open fields of the provisioning description template based at least in part on the service agreement offer; and (ii) automatically filling in the one or more open fields of the provisioning description template with the one or more values based at least in part on the implementation plan template.

* * * * *